Dec. 28, 1965    J. M. SLATER    3,225,605
EDDY CURRENT INDUCTION DEVICE
Filed Sept. 30, 1959    4 Sheets-Sheet 1

*INVENTOR.*
JOHN M. SLATER

BY Allan Rothenberg

ATTORNEY

INVENTOR.
JOHN M. SLATER

BY Allan Rothenberg

ATTORNEY

Dec. 28, 1965   J. M. SLATER   3,225,605
EDDY CURRENT INDUCTION DEVICE
Filed Sept. 30, 1959

INVENTOR.
JOHN M. SLATER
BY
Allan Rothenberg
ATTORNEY

Dec. 28, 1965  J. M. SLATER  3,225,605
EDDY CURRENT INDUCTION DEVICE
Filed Sept. 30, 1959  4 Sheets-Sheet 4

INVENTOR.
JOHN M. SLATER
BY Allan Rothenberg
ATTORNEY

United States Patent Office 3,225,605
Patented Dec. 28, 1965

3,225,605
EDDY CURRENT INDUCTION DEVICE
John M. Slater, Fullerton, Calif., assignor to
North American Aviation, Inc.
Filed Sept. 30, 1959, Ser. No. 844,606
11 Claims. (Cl. 73—503)

This invention relates to eddy current induction devices, and most particularly concerns apparatus making use of a variable frequency moving (polyphase) field to generate, in an adjacent conductor, eddy-current forces in accordance with the frequency of the field components.

The principles of this invention have application in integrating and differentiating devices and other force balancing apparatus. As applied for use as an integrating accelerometer or velocity meter, the present invention in one embodiment thereof comprises an improvement on the instrument described in U.S. Patent No. 3,077,782 to John M. Slater et al. Described in said U.S. patent is a singly integrating accelerometer of the eddy current induction type wherein a permanent magnet is rotated relative to a pendulous conductor to provide the restoring torque necessary to maintain the pendulous member in a null position.

While the device of the above-mentioned U.S. patent and other similar apparatus have distinct practical advantages, they also have certain disadvantages or limitations which it is an object of the present invention to avoid. In particular, prior devices involve the use of a rotating element within the instrument itself. Especially in the rotating magnet type, the inertia of the rotor is high enough to introduce a lag in response which cannot be tolerated in the case of certain guidance systems subject to very rapid rate of change of acceleration. Further, in the case of instruments which are liquid submerged in order to take most of the load from the precision bearings which support the conductor, it is necessary to introduce a septum or partition between the supported element and the magnet in order to avoid disturbing viscous drag forces. This arrangement requires relatively large magnetic gaps and can result in production of considerable stray magnetic flux. A third limitation of prior devices is that the adjustment of the scale factor of the instrument must be performed by changing the field strength of a permanent magnet, or the working gap, and it is rather difficult to make a precision adjustment by this method. Still another disadvantage is that the rotation counter which gives a measure or indication of the integral of the input acceleration must be located at the instrument itself, on a gimbal-mounted platform, whereas a more convenient place for such output counter would be at the computer which processes the integrated acceleration signal. Accordingly, a principal object of this invention is to provide an eddy current induction device wherein each of the above-mentioned disadvantages and limitations is eliminated or substantially diminished.

In carrying out the principles of this invention in accordance with a preferred form thereof, all of the above-enumerated disadvantages are eliminated by providing a polyphase electromagnetic stator and providing means for moving the field thereof relative to the conductor so as to generate the necessary restoring force of this force balance instrument. When the field strength of the electromagnet is kept constant in magnitude, the rate of motion of the field will be a linear function of the restoring force so that an indication of total field motion comprises a measure of the first time integral of acceleration as is desired. First and second elements are mounted for displacement relative to one another in response to an input force caused by the acceleration to be measured. The eddy current apparatus is arranged to substantially maintain a predetermined relative positioning of these elements, that is, to move the elements back toward the relative null position from which they are urged upon acceleration. The eddy current apparatus comprises a conductive member affixed to the first element and electromagnetic means affixed to the second element for producing a constant magnitude magnetic field in and about the conductive member. Control means are provided for causing the magnetic field to move relative to the conductive member at a rate proportional to the relative displacement of the elements. The integrated output of the device is provided by output means which manifest the motion of the field which is the first time integral of the rate of field motion. The magnetic field is caused to be moved at a speed and in a sense determined by the magnitude and sense of the relative displacement of the two elements from null position. This operation is achieved in described embodiments by varying the frequency of a polyphase current which is maintained at a constant peak-to-peak magnitude. The term constant magnitude as used herein in connection with polyphase current and polyphase magnetic field denotes an unvarying peak-to-peak amplitude of the magnetic field (flux).

For the production of the variable-frequency constant-magnitude polyphase current, such simple expedients as variable frequency oscillators, variable speed alternating-current generators, or two-phase resolvers under servomotor control, are contemplated for those applications of the invention wherein lack of precision may be tolerated. However, deficiencies of these devices are particularly evident when applied for use in a precision integrating accelerometer. Such an instrument, to be useful in navigation and ballistic missile guidance, must have a high linearity, on the order of 1 part in 1,000 to 1 part in 10,000 or more, and additionally must have an exceedingly low variable bias or drift. Further limitations of the above expedients are imposed by the requirement that the frequency of the polyphase current must go through zero. Accordingly, another object of this invention is to provide precision means for generating a moving magnetic field while maintaining an accurately constant peak-to-peak magnitude thereof.

A further object of this invention is to provide an improved integrator or differentiator.

Still another object of this invention is the provision of an instrument having no rotating parts on the instrument itself.

A further object of the invention is to provide an instrument which utilizes rotating parts of minimum inertia.

Still another object of the invention is to provide an improved magnetic circuit for a liquid immersed eddy current induction device.

Another object of the invention is to provide an instrument in which scale factor can be conveniently adjusted.

A further object of the invention is to provide an integrating instrument wherein the output apparatus can be most conveniently located.

These and other objects of the invention will become apparent from the following description taken in connection with the accompanying drawings in which FIG. 1 is a functional diagram of an integrator embodying the principles of this invention;

Figure 9:
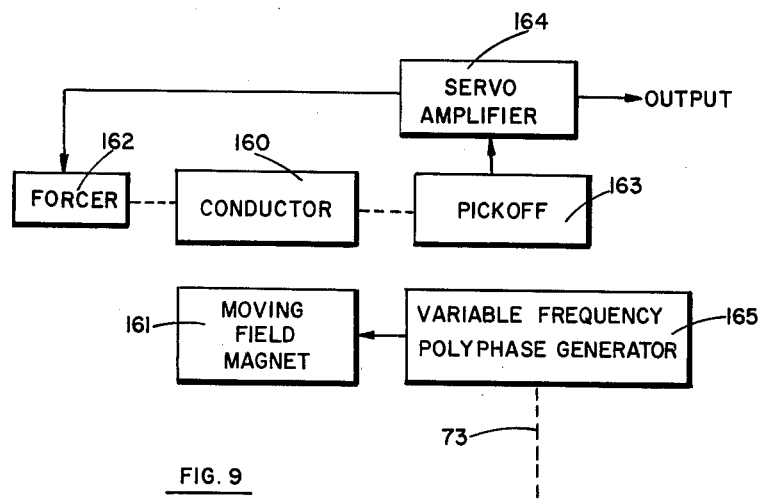
Figure 6:
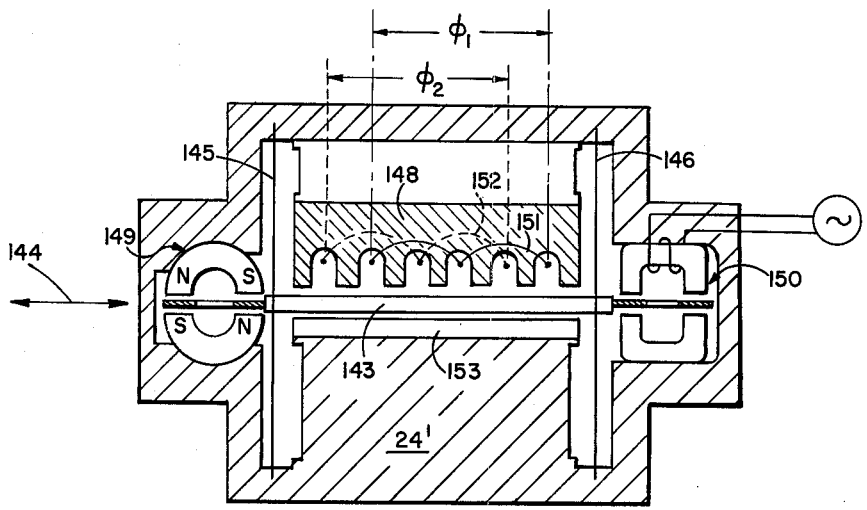
Figure 7:
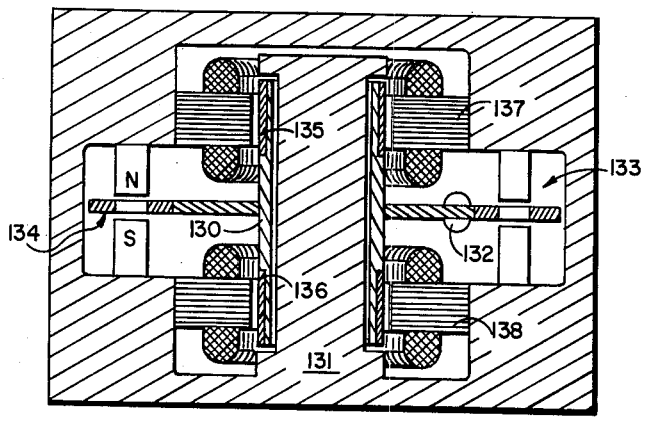
Figure 8:
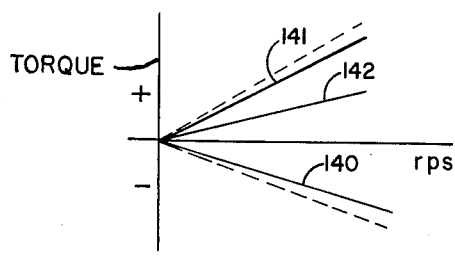

FIG. 6 comprises a sectional view of a modified form of integrating accelerometer;

FIG. 7 illustrates an integrating accelerometer compensated for temperature;

FIG. 8 is a graph illustrating the temperature compensation operation of the device of FIG. 7; and FIG. 9 is a functional diagram of the application of the principles of the invention for use as a differentiator.

In the drawings, like reference characters are used to designate like parts.

Figure 1:
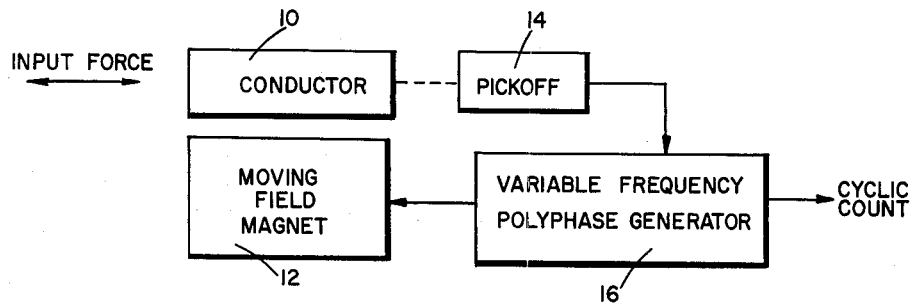

As illustrated in FIG. 1, an integrator constructed according to the principles of the present invention comprises a conductor 10 and a moving field magnet 12 which are carried on a suitable support (not shown in this figure) for limited relative motion in response to and in the direction of some input force which may be applied to either one of elements 10 and 12. The apparatus is arranged so that the eddy current forces produced by the conductor and the moving field of the magnet will be equal and opposite to the input force so as to maintain a predetermined relative position or null position between the elements 10 and 12 and thus limit the relative motion thereof without requiring rotation or movement of any physical parts of the induction apparatus. To this end, relative motion of members 10 and 12 is sensed by a pickoff 14 which produces an output utilized to control the frequency of a variable frequency polyphase generator 16 having a polyphase current output which is fed to the coils or windings of the electromagnet 12. The polyphase current produced by generator 16 is of constant peak-to-peak magnitude and has a frequency linearly related to the output of pickoff 14 whereby the motion of the field of the magnet 12 has a speed proportional to the relative displacement. Thus, any suitable integration of either the rate of motion of the magnetic field or the frequency of the polyphase current will provide an output indicative of the time integral of the input force. This integral output is provided by any suitable means which may, for example, count the cycles or periods of the polyphase current to thereby count the number of rotations of the cyclical current and of the magnetic field when such field is caused to be of the rotating type.

Figure 2:
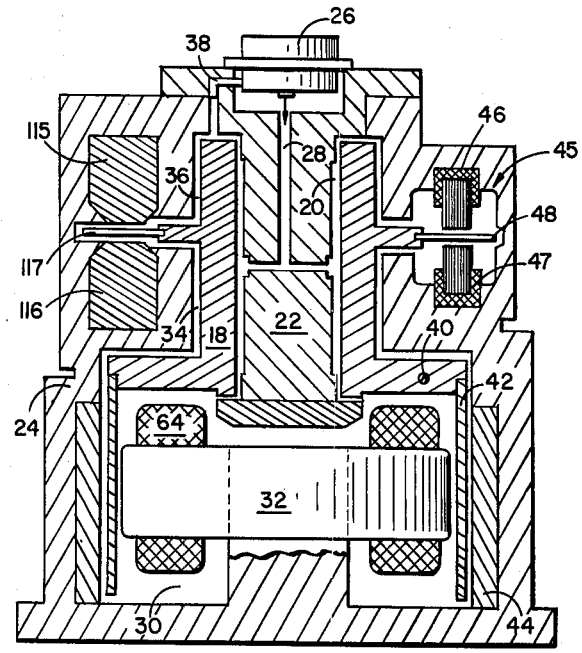
FIG. 2 is a sectional view of an integrating accelerometer constructed in accordance with the principles of the invention.

Illustrated in FIG. 2 are the structural details of an integrating accelerometer which is arranged to provide the necessary eddy current force balance by use of a variable-frequency constant-peak-to-peak-magnitude polyphase current. The instrument includes a flanged sleeve-like member 18 which is journaled by means of hydrostatic (pressure supplied) bearing 20 in a fixed base member which includes an inner cylindrical portion 22 and an outer case portion 24 rigidly secured thereto. The bearing is comprised of a pump 26 which may be of the type more particularly disclosed in U.S. Patent No. 3,070,024 to Edgar B. Romberg for Magnetic Drive. The pump forces a suitable relatively dense liquid through an input conduit 28 into the working gap of the cylindrical journal bearing 20 and to an enclosed chamber 30 in which is mounted a polyphase electromagnet 32 fixedly secured to the base 24. The return path of the bearing fluid includes conduits 34, 36, and 38. Thus, the element 18 is supported with negligible friction for angular deflection about the axis of symmetry thereof which extends vertically in the plane of the paper in FIG. 2. Element 18 is made pendulous or unbalanced as by insertion of a slug 40 of a material of greater density so that in effect there is provided a pendulum subject to deflection under acceleration in a direction normal to the plane of the drawing. Element 18 has fixedly secured thereto an annular sleeve 42 of electrically conductive and non-magnetic material such as, for example, manganin or constantan which are alloys characterized by low or zero temperature coefficient of resistivity over a certain operating range. The annular conductor 42 extends into chamber 30 between the electromagnet 32 and an annular magnetic flux return member 44 which is fixedly secured to the case 24. The eddy current producing elements 32, 42 and 44 are arranged symmetrically with a close gap between the magnet, the conductor, and the flux return member. The magnet and the flux return member can be of laminated construction if desired, but in some applications of the invention the maximum operating frequency is so low, not more than a few cycles per second, that solid iron can be used for the flux return member 44 and for the core of electromagnet 32.

A conventional pickoff 45 is provided to sense deflections of the pendulous assembly. The pickoff 45 may comprise a pair of alternating current energized magnets 46 and 47 fixedly carried by case 24 and a flat coil 48 secured to the pendulous member 18 and extending between the opposing poles of the two magnets whereby upon relative motion of the coil 48 and magnets 46 and 47 there is induced in the coil 48 a current proportional to the relative displacement and having a phase relative to the phase of the current which energizes magnets 46 and 47 dependent upon the sense of the relative displacement. The output of the pickoff from moving coil 48 is fed to a rotating field generator which is illustrated diagrammatically in FIG. 3.

Figures 3, 4:
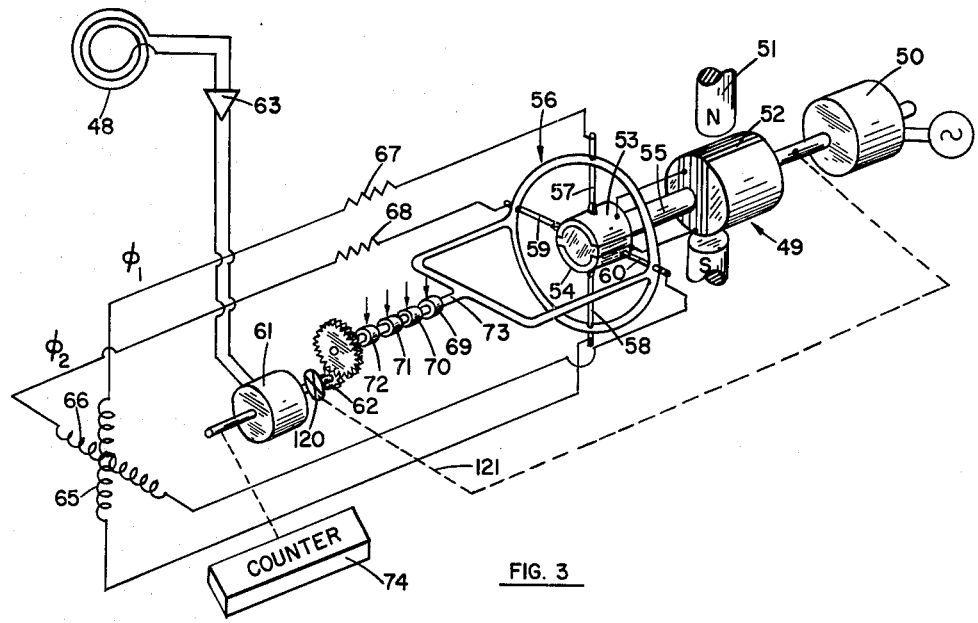
FIG. 3 illustrates one form of polyphase current generator for use with the integrating accelerometer of FIG. 2.
FIG. 4 shows a second embodiment of the polyphase current generator.

The rotating field generator comprises any suitable precision direct-current source 49 which may be of the permanent magnet field type with temperature compensation for the field provided in a known way. As illustrated in FIG. 3, the direct-current generator is run at an accurately constant speed as by a synchronous motor 50. A permanent magnet 51 has a direct-current generator rotor coil 52 mounted for rotation between its poles. The windings of rotor 52 are connected to commutator segments 53 and 54 on the direct-current generator shaft 55. While only two commutator segments are shown for clarity of the drawings, it will be readily appreciated that the conventional direct-current generator ordinarily is a multi-polar machine. There is provided a rotatable brush assembly 56 having two pairs of brushes 57, 58, 59 and 60 in space quadrature. Assembly 56 is mounted for rotation in either sense under control of a servomotor 61 which drives the brush assembly by means of suitable gearing 62. Servomotor 61 is of conventional type having an output shaft speed which is proportional to the input signal to the motor. The input signal to the motor is provided at the output of a servo amplifier 63 which has an input from the pickoff coil 48 and which is, of course, phase-referenced from the alternating-current source, not shown, which energizes the magnets 46 and 47 of the pickoff. While an alternating-current servomotor 61 may be utilized, it will be readily appreciated that for use with a direct-current servomotor suitable demodulation of the amplitude modulated alternating-signal from pickoff coil 48 will be provided in the servo amplifier 63, or elsewhere as may be convenient. Electromagnet 32 (FIG. 2) has field windings 64 comprising, as illustrated in FIG. 3, a pair of coils 65 and 66 arranged in space quadrature. Coil 65 is connected to brushes 57 and 58 of assembly 56 through resistor 67, while coil 66 is connected to the quadrature pair of brushes 59 and 60 through resistor 68. While the connections are shown directly between the brushes and the coils, for purposes of clarity in the drawings, it will be readily appreciated that the connections to the brushes and to the coils 65 and 66 must, in practice, and will be in practice, made by means of a set of slip rings 69, 70, 71, and 72, mounted on the shaft 73 of the rotating brush assembly 56. Thus, it will be seen that the variable frequency generator provides a polyphase current, in this case two components in phase quadrature, of constant magnitude or constant peak-to-peak variation to the electromagnet coils 65, 66, whereby the resultant flux produced by these field coils will rotate at the frequency of the rotational speed of the brush assembly 56. The rotating magnetic field is of constant precise peak-topeak magnitude. The frequency of the field rotation is the frequency of the brush assembly rotation and is linearly related to the pickoff output which is proportional to the relative displacement of the elements of the pickoff. The sense of the phase of one current component relative to the phase of the other (i.e., leading or lagging) is determined by the sense of rotation of the brush assembly and, therefore, by the sense of the relative displacement of the conductor and electromagnet. Thus, the direction of rotation of the field depends on the sense of the input force.

In operation, when acceleration is zero and there is thus no force urging relative displacement of the conductor and electromagnet of FIG. 2, the pickoff output is at null and the rotating brush assembly 56 and the servomotor 61 are stationary. There is no varying energization of the polyphase field coils 65 and 66, and the generator thus produces no varying output or an output of zero frequency. Upon occurrence of acceleration the pendulous mass 18 tends to deflect, and in fact does deflect, to a slight extent, depending upon the tightness of the servo loop. An output from pickoff coil 48 is provided to the servo controller 63 which then energizes the servomotor to rotate the brush assembly at a speed proportional to the pickoff output and in a sense according to the sense of such output. The magnetic field provided by the polyphase coils 65 and 66 thus rotates synchronously with the rotation of the brush assembly, and the speed of rotation thereof is, therefore, a linear function of acceleration. When the acceleration goes to zero, the entire brush assembly 56 comes to rest.

The rotating magnetic field provided by the magnet 32 extends through the conductor 42, in and about this conductor, and provides a flux which is returned by means of a path provided by flux return member 44. As the magnetic field rotates relative to the conductor 42, eddy currents are generated therein which react with the magnetic field to produce a force tending to oppose the acceleration induced force and thus tending to return the pendulous element 18 and its pickoff to the null position. In this manner under a steady acceleration, for example, the apparatus of FIG. 2 may achieve a rest position with a relatively minute displacement of the pendulous element from null position, and a pair of counter-balancing forces acting thereon, one force being provided by the forces of acceleration while the other is provided by the counter-balancing eddy current induced forces produced by the rotation of the magnetic field relative to the conductor 42 (with brush assembly 56 rotating). The eddy current balancing forces are directly proportional to the rate of movement of the magnetic field across the conductor 42, and this rate of movement is proportional to the rotational velocity of the brush assembly 56. The velocity of the latter is in turn proportional to the pickoff output which itself is proportional to the acceleration experienced by the accelerometer. Thus, integration of the rate of motion of the magnetic field or of the rotational velocity of the servomotor or of the brush assembly will provide integration of the input acceleration.

The integration may be provided most conveniently by a rotation counter 74 having an input from the shaft of servomotor 61. Alternatively the frequency or cycles of the polyphase current may be counted with the aid of a two-phase resolver or a set of commutators mounted on the shaft of servomotor 61. Of course, if the device is scaled for a relatively high frequency output, the output can be taken directly from the field leads without requiring a geared-up output device. Thus, any suitable electrical device coupled with the leads to coils 65 or 66 may be utilized to provide a signal having a frequency indicative of the field rotation, and the cycles of current of this frequency may be simply counted to provide a pulse for each cycle in a manner well known to those skilled in the art.

Ordinarily two or three accelerometers are required for a given guidance or navigation system. Such an arrangement would not require duplication of the entire equipment shown in FIG. 3. A single constant speed direct-current generator or single source of precision direct-current would suffice, but for additional polyphase field windings of the additional accelerometers there may be provided two or three or additional sets of servo-driven brush assemblies 56 all working on the same commutators 53 and 54 or all energized by the same direct-current source. Alternately the direct-current generator 49 may synchronously drive a plurality of commutator segments 53, 54, or pairs of such segments each on an individual shaft and synchronously driven by the motor 50, and a separate brush assembly 56 would be provided for each pair of commutator segments.

Resistors 67 and 68 are inserted in the connection from the brushes of assembly 56 to the field coils 65, 66 (between slip rings 69–72 and the coils) in order to to isolate the two phases from each other and further to isolate the various channels or different electromagnets from each other when two or three brush assemblies are operated from the same commutator. Typically the resistance of elements 67, 68 may be on the order of one hundred times that of the impedance of the stator windings. Of course, if deemed necessary or desirable, suitable amplification of the polyphase current from the slip rings 69 through 72 may be provided.

Illustrated in FIG. 4 is an alternative embodiment of apparatus for accurately generating a precision variable-frequency constant-peak-to-peak-magnitude polyphase current. There is provided a precision constant direct-current voltage supply 75 which may be identical to the generator 49 of FIG. 3. The supply 75 is fed across a scale factor adjusting potentiometer 80 to a pair of potentiometers 81 and 82, each of which comprises a card or nonconductive rigid base 83, 84, carrying a grid or winding 85, 86 of a suitable resistance wire. Each card additionally mounts a pair of brushes 87, 88, and 89, 90 carried on rotatably mounted brush arms 91 and 92 respectively. The two brush arms 91, 92, together with the brushes thereof, are in space quadrature (relative to the respective resistance windings) and are mechanically coupled as by shaft 93. Thus, there is provided a rotatable brush assembly driven by the output shaft of the servomotor 61 which may be identical to the servomotor 61 of FIG. 3 and which is connected to the moving coil 48 as previously described. The brushes 87, 88 and 89, 90 of the two potentiometers are connected (by slip rings not shown) to opposite ends of the polyphase field windings 65 and 66, respectively, as illustrated. The arrangement shown in FIG. 4 supplies sine-cosine components to the field coils which would be perfectly sinusoidal if the field had infinite resistance. To the extent that the field loads the potentiometers the desired sinusoidal relation is not maintained. In many instance, however, the lack of precision of the desired wave shape may be tolerated. Alternatively the potentiometer windings can be loaded or modified in a manner known to those skilled in the art, taking into account the impedance of the field windings so as to produce a sufficiently close approximation of the desired sinusoidal wave shape. However, it is to be observed that a high degree of precision in the wave shape is not required since the potentiometers as utilized herein are multi-revolution devices. Thus, typically the constants might be such that the polyphase magnetic field and the potentiometer arms 91 and 92 rotate at one revolution per second for each unit $g$ (=acceleration of gravity) of acceleration. In attaining a speed of 3200 feet per second, for example, which is to be indicated by the velocity meter of the exemplary embodiment, the rotating field and the potentiometers too would turn through some 100 revolutions. To resolve to 1 part in 10,000, or 0.32 feet per second, is equivalent to a resolution of 3.6 degrees of rotation in the potentiometers. Such resolution is easily attainable.

In order to minimize changes of scale factor with temperature, the circuits in FIG. 4 can be embodied in manganin or constantan wire which have little or no temperature coefficient of resistivity over predetermined operating ranges.

Figure 5:
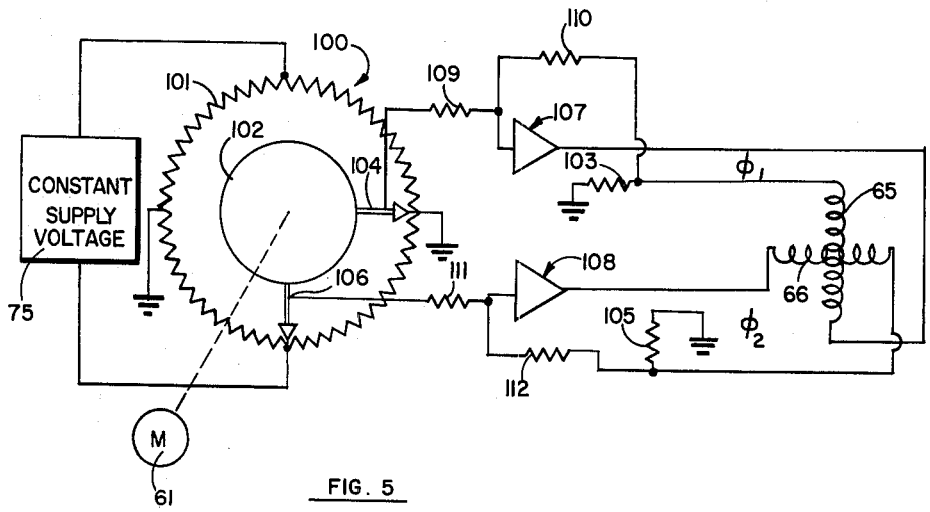
FIG. 5 shows a third embodiment of the polyphase current and magnetic field generator.

Illustrated in FIG. 5 is a modification of the fixed-magnitude variable-frequency polyphase generator of FIG. 4 which is arranged to avoid the need for modifying the potentiometer windings to attain sinusoidal output. This arrangement also simplifies temperature compensation. The servomotor 61 drives a manganin-wound sine-cosine potentiometer 100 which is equivalent to the pair of potentiometers 81, 82 of FIG. 4. The dual potentiometer 100 comprises a manganin resistance wire 101 energized from a precision, constant-direct voltage supply 75, and includes a rotatable brush assembly 102 having brushes 104 and 106 which respectively provide the polyphase current of phases $\phi_1$ and $\phi_2$ to the field coils 65 and 66 of the electromagnet. In this instance the sinusoidal voltage from each brush 104 and 106 is fed to summing amplifiers 107, 108 respectively which have as a second input to the resistive summing network thereof a voltage proportional to the current which is flowing in the respective field coils 65, 66. The summing networks at the input of the summing amplifiers include, for amplifier 107, resistor 109 coupled to brush 104, and resistor 110 connected to the junction of the winding 65 and a precision resistor 103. For amplifier 108 the resistive network comprises a resistance 111 coupled to brush 106 and a resistance 112 which feeds back a signal to the amplifier input proportional to the $\phi_2$-current through precision resistor 105. With this arrangement the potentiometer 100 is very lightly loaded, and therefore, nearly pure sinusoidal outputs are obtained. Further, since the amplifiers operate on current rather than a voltage basis, the polyphase windings of the electromagnet have no net temperature coefficient. It has been found that the use of an arrangement such as that shown in FIG. 5 enables achievement of a high accuracy on the order of 0.01 percent or better.

For use in a guidance system it is ordinarily desirable to apply bias torques to the accelerometer for compensation of certain accelerations, such as, for example, the acceleration of Coriolis, which accelerations could otherwise introduce error into the velocity measurement. Accordingly, in the apparatus of FIG. 2 there is shown a torquer comprising a pair of C-shaped magnets 115 and 116 secured to the base 24 and having adjacent poles of opposite polarity. Mounted between the facing poles of the two magnets and secured to the pendulous element 18 is a flat coil 117 which is arranged to receive a direct-current signal proportional to the desired torque. Upon energization of the coil 117 with such direct-current signal a torque is exerted in a direction normal to the plane of the paper and of a sense depending upon the polarity of such direct-current signal which tends to effect rotation of the pendulous element 18 in its bearing.

In those instances where the integrating accelerometer is to be utilized with its sensing axis vertical, the full gravitational acceleration must be handled and compensated. Ordinarily such compensation, if too great a torque is not required thereby, may be handled by the torquer. However, if it is desired to relieve the torquer of the job of handling this large correction, the apparatus illustrated in FIG. 3 may be conveniently modified to enable the eddy current torquing apparatus to provide a large, fixed, gravity-compensating torque. This modification may be achieved, as illustrated in FIG. 3, by the use of a mechanical differential 120 in the mechanical connection between the output shaft of servomotor 61 and the gearing 62 driven thereby. Thus, servomotor 61 provides one input to the differential 120. The second input to the differential 120, which comprises the fixed, gravity-compensating torque, may be provided by a mechanical connection 121 from the drive shaft of the synchronous motor 50 of the direct-current generator 49. Thus, in the absence of an acceleration which produces an input to servomotor 61 from pickoff coil 48, the rotating brush assembly 56 will be driven at a constant speed to product a constantly rotating magnetic field and thus provide an eddy current produced torque which compensates for a relatively large portion of the gravitationally induced error. The connection from the synchronous motor 50 to the differential 120 is scaled so as to put in a constant correction for some nominal value of gravity, such as, for example, 980.00 centimeters per second squared, so that the torquer need only handle variations of this gravitational correction due to altitude which are on the order of one percent or so. Thus, the variations of the gravitational correction from this programmed nominal value would be fed as a direct-current signal to the coil 117 of the torquer.

The apparatus of the previous embodiments, as described above, uses manganin or constantan for the conductor in order to minimize temperature sensitivity. The only disadvantage of such an arrangement is that these alloys have a rather low specific conductivity, on the order of about 4 percent that of copper, so that the pendulous moment is diminished in view of the relatively small induced eddy current torque. By means of the arrangement shown in FIG. 7, an effective net eddy current torque of about 25 percent of that attainable by the use of a copper conductor can be obtained while still realizing complete temperature compensation. The temperature compensating arrangement basically utilizes a pair of eddy current conductor members of different conductivities and different temperature resistivities and causes the conductor with the higher conductivity and resistivity to exert an eddy current induced torque of lesser magnitude and of sense opposite to the sense of the torque induced by the conductor of less conductivity and resistivity. Thus, as illustrated in FIG. 7, the pendulous element 130 journaled in fixed base 131 has an unbalance or pendulous mass 132 secured thereto and is also provided with a pickoff 133 and a torquer 134 which may be identical to the pickoff and torquer previously described. In this arrangement, two annular conductors 135 and 136 are secured to the pendulous element 130 and each conductor is arranged to individually cooperate with a different one of two polyphase electromagnets 137, 138, arranged as illustrated in the drawing. The two polyphase stators 137 and 138 are connected to the polyphase field current generator so that their fields rotate in opposite directions. For example the field coils of stator 137 may be connected as are coils 65, 66 illustrated in FIG. 3. The field coils of stator 138 are arranged respectively in quadrature space relation to the corresponding coils of stator 137, but the connections of the coils of 138 to the commutator 53 are reversed as compared with the connections of the coils of stator 137 to the commutator. Thus brushes 57 and 58, while connected to the phase 1 coil of stator 137, would at the same time be connected to the phase 2 coil of stator 138 to produce in each conductor respectively opposite sense rotating magnetic fields. Conductor 135 may be, for example, of a brass alloy having a specific conductivity $S'=\frac{1}{2}S$ where $S$ is the specific conductivity of the conductor 136 which is made of copper. Similarly the conductor 135 will have a temperature resistivity coefficient $C'=\frac{1}{2}C$ where $C$ is the resistivity coefficient of the copper conductor 136. The effective volumes of the two conductors are so proportioned as by making the thickness of the conductor 135 twice the thickness of conductor 136 (to provide a volume ratio of two-to-one), for example, so that at any given frequency a negative torque $L$ at conductor 136 is numerically equal to one-half of the positive torque $2L$ at conductor 135. Thus, a net positive restoring torque for the pendulous moment exists which is equal to $+L$.

FIG. 8 shows how the negative torque 140 of the copper conductor 136 and the positive torque 141 of the brass conductor 135 vary with frequency to produce the net positive torque indicated by line 142. With a given temperature change, the positive torque in conductor 135 at any given frequency will rise to give the curve indicated by the dotted line, but the opposing torque in conductor 136 at the same frequency will increase negatively by exactly the same amount so that the net torque indicated by line 142 which is available for restoring the pendulum is not changed. Since both conductors 135 and 136 are maintained at substantially the same temperature due to their relative proximity to each other, the result is just as if a single conductor were used of zero temperature coefficient and of specific conductivity 0.25 that of copper. This is so by reason of the fact that the torque provided by element 135 is one-half that which would be provided if the conductor 135 were of copper and this one-half value torque is itself opposed by a torque of opposite sense and of value one-half the positive torque to produce a net torque in the positive direction of one-quarter that which would be produced by a copper conductor alone. It will be readily appreciated that the relative proportioning of the positive and negative torques may be alternatively achieved by variation of the magnetic gap used with the two conductive members or may be varied by effecting relative variation of the constant magnitude field strength. Further, while exact temperature compensation is achieved by the provision of temperature resistivity coefficient and specific conductivities together with positive and negative torques which are relatively proportioned by the factor 1/2, it will be readily appreciated that other than optimum temperature compensation may be achieved by other relative proportioning of these factors.

The concept and arrangement for using two different conductors of specific conductivity and temperature resistivity coefficients matched and proportioned as described above may be used in velocity meters of the rotated magnet type as described in the aforesaid U.S. Patent No. 3,077,782. However, the mechanical complication of providing two counter-rotating magnets is rather formidable, whereas installing a pair of polyphase stators entails little more difficulty than the use of a single stator.

The instruments of FIGS. 2 and 7 are of the pivotal or pendulous type which is ordinarily the most convenient to build but which has the limitation that it is subject to cross-coupling errors when the pendulum element is not exactly at null. The displacement under steady state acceleration from the null condition is, of course, dependent upon the tightness of the force balance servo loop or the gain of the servo loop as particularly controlled by the servo controller 63 of FIG. 3.

FIG. 6 illustrates an instrument of the true translational type which is not subject to any cross-coupling errors but which still utilizes the electrically produced moving magnetic field. The conductor of this embodiment comprises a nonmagnetic bar 143 of constantan or the like which could, of course, be supported for limited linear or translational motion along the sensing axis 144 of the instrument in a fluid-lubricated slide bearing. For purposes of simplicity the conductor 143 is illustrated as supported by flexible tensioned filaments 145 and 146 which are secured to the respective ends of the conductor member 143 and also to the base 24'. Thus, the conductor comprises an acceleration-responsive mass which is supported for limited motion in response to acceleration forces applied to the instrument. A "torquer," or forcer in the case of this linear instrument, is provided as indicated at 149 which may be identical to the torquer 115, 116, 117, illustrated in connection with FIG. 2. There is also provided a pickoff 150 having a pair of electromagnets mounted to the base 24' and a moving coil mounted to the conductor 143. This pickoff may also be identical to the pickoff 45 illustrated in FIG. 2. There is provided a linear polyphase electromagnet 148 having a pair of two-phase windings 151 and 152 which comprise the two-phase $\phi_1$ and $\phi_2$ stator windings for connection to the polyphase current generator as illustrated in any of FIGS. 3, 4, and 5. The operation of the instrument of FIG. 6 is substantially similar to the operation of the instrument of FIGS. 2 and 7 except for the fact that the input acceleration force produces a translation motion of the conductor 143 rather than limited rotational motion thereof, and also, of course, the magnetic field produced by the linear electromagnet 148 is caused to move linearly in the direction of the input axis 144 relative to the conductor 143. As in the previous embodiment, there is provided a flux return member 153 to complete the magnetic circuit.

The apparatus of FIG. 2 can be converted from an integrating accelerometer to a general purpose integrator simply by making the pendulous element 18 nonpendulous, or making it perfectly symmetrical insofar as its mass is concerned about its bearing. This may be achieved, of course, by simply omitting the unbalance mass 40. In this arrangement the signal to be integrated would be supplied as a suitable direct-current signal (for the illustrated torquer) providing a current to the torquer whereby the input force would then be the force exerted by the torquer. This force would be integrated just as the acceleration-induced forces are integrated as previously described. The input current to be integrated might come, for example, from an electromagnetically restored non-integrating accelerometer mounted on the stable platform of a guidance system, in which system velocity components are required.

The apparatus of FIG. 6 is also capable of use as an integrator by simply matching the net density of the filament supported element 143 with that of the liquid in which it is immersed so that a neutrally buoyant condition claims. In this arrangement, of course, the input force to be integrated would be fed to the forcer 149 as a direct current to the coil thereof. Such an arrangement, however, requires critical temperature control and for use as a general purpose integrator the apparatus of FIG. 2 is preferred.

Also contemplated is the use of the principles of this invention to provide general purpose differentiators for tachometers, as illustrated in FIG. 9. As shown in FIG. 9, conductive member 160 cooperates with the moving field electromagnet 161 to generate eddy current forces which exactly oppose forces applied to effect relative displacement of the conductor and magnet which forces are applied by a torquer or forcer 162 such as previously described. In this arrangement the pickoff 163, which may be identical with those described above, provides an output to a servo amplifier 164 which in turn supplies the control current to the forcer 162. The variable frequency generator 165 will be, in this case, identical with any one of the generators illustrated in FIGS. 3, 4, or 5, and will have the input shaft 73 or 93 thereof driven by the signal to be differentiated. The signal to be differentiated may be applied as a continuously varying angular displacement of the input shaft 73 of the rotatable brush assembly so that the velocity of rotation of the brushes and thus the frequency of the polyphase current produced thereby will be proportional to the first time derivative of the continuously changing angular displacement input signal. The eddy current induced forces provided by the moving field of the magnet 161 are proportional to the generator rotation or generator frequency and thus proportional to the input velocity and to the derivative of the input displacement. The servo loop, of course, provides a current from the pickoff and from the servo amplifier 164 to the forcer 162 such as to provide a force equal and opposite to the eddy current induced forces whereby the signal in the pickoff-to-forcer servo loop will be proportional to the first time derivative of the input angular displacement. Conveniently the output of the servo amplifier may provide the desired differentiated output. The input to the polyphase generator 165 might, for example, be derived from a distance meter which, as well known, is in effect a doubly integrating accelerometer and provides a signal (shaft angular velocity) proportional to vehicle velocity and also a signal (total shaft angle) proportional to distance traveled. The output of the device of FIG. 9 would thus provide a signal proportional to velocity, and may provide a torque output to be supplied to a platform gyroscope. As an example, if the input to this differentiator be derived from the output shaft of some motor, the output may be calibrated to yield a direct indication of revolutions per minute.

In one sense, the apparatus constructed according to this invention may be considered as a precision analog-to-digital or digital-to-analog converter, in each case characterized by having an accurately linear correspondence between a force or current and a rotation frequency or pulse repetition rate.

In the instruments of the described invention, heat is generated in proportion to the product of the square of current and resistance in the polyphase stator windings. The effect could be minimized by making the stator support in FIG. 2 an aluminum column, for example, of relatively large mass to conduct heat out to the base, or by locating the polyphase stator outside rather than inside the conductor and having it exposed to the air.

It will be seen that the several embodiments described above provide instruments which have distinct and practical advantages. There are no rotating parts on the instrument itself which makes for minimum size and complexity and also provides a high degree of reliability. All of the parts are solidly mounted and chances of parts becoming displaced or distorted under applied vibration are reduced to a minimum. Further, since the polyphase stator can be immersed directly in the liquid of the hydrostatic bearing and no septums are needed, an exceedingly efficient magnetic circuit is made possible. Rotating mechanical elements are required in the means for generating the rotating field but, as has been seen, these rotating parts, particularly those of FIGS. 4 and 5, can be of small inertia as compared with the inertia of a permanent magnet assembly, for example. Still another advantage which is achieved by the described invention is that the scale factor of the instrument can be adjusted simply by varying a resistor, such as one of the resistors 67, 68 of FIG. 3, without the need for any mechanical adjustments of rotational speed, for example. Further, the revolution counter or output device which indicates the number of elapsed periods or cycles of the rotating field or the polyphase current can be located in the most logical place, that is, at the input to the computer which utilizes this output rather than on or at the instrument itself. Thus, there is eliminated much of the complexity of the gimbaled platform components.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a force balancing instrument, a support, a first member fixed to said support, a second member carried on said support for motion relative to said first member upon application of a force to one of said members in the direction of said relative motion, said second member comprising an electrically conductive element, said first member comprising electromagnetic means energizable with polyphase current for providing in said second member a magnetic field, a variable polyphase current generator for supplying current to said electromagnetic means, and means for controlling said generator to vary the speed and sense of motion of said magnetic field so as to produce an induced eddy current force in said second member in opposition to said applied force.

2. In a force balancing instrument, a support, a first member fixed to said support, second member carried on said support for motion relative to said first member upon application of a force to one of said members in the direction of said relative motion, said second member comprising a conductive element, said first member comprising electromagnetic means for providing in said second member a constant peak-to-peak magnitude magnetic field, and means for limiting relative displacement of said second member comprising means for controlling the speed and sense of motion of said magnetic field so as to produce an induced eddy current force in said second member in opposition to said applied force.

3. In a force balancing instrument, a support, a first member fixed to said support, a second member carried on said support for motion relative to said first member upon application of a force to one of said members in the direction of said relative motion, said second member comprising a conductive element, said first member comprising electromagnetic means having polyphase windings for providing in and about said second member a constant peak-to-peak magnitude magnetic field; and means for controlling the speed and sense of motion of said field so as to produce an induced eddy current force in said second member in opposition to said applied force, said controlling means comprising a rotatable brush assembly having a plurality of brushes, servo means for controlling the rotation of said assembly in accordance with the relative displacement of said second member, means for energizing brushes of said assembly with current of different phases upon rotation of said assembly, and means coupling said brushes to said windings.

4. An integrating device comprising a support, a conductive member and a polyphase electromagnetic member adjacent thereto, one of said members being fixed to said support, means mounting the other of said members to said support for movement from a null position upon application of a force thereto, said polyphase member having windings which produce a magnetic field movable relative thereto in response to a polyphase current supplied to said windings, generating means for supplying to said windings a polyphase current of constant peak-to-peak magnitude and variable frequency, pickoff means for detecting movement of said other member from said null position, means responsive to said pickoff means for controlling said generating means and adjusting said polyphase current such that said magnetic field induces eddy currents in said conductive member to urge the latter toward said null position, and means for manifesting the number of cycles of said polyphase current.

5. An integrating device comprising a support, a conductive member and a polyphase electromagnetic member adjacent thereto, one of said members being fixed to said support, means mounting the other of said members to said support for movement from a null position upon application of a force thereto, said polyphase member having windings which produce a magnetic field movable relative thereto in response to a polyphase current supplied to said windings, generating means for supplying to said windings a polyphase current of constant peak-to-peak magnitude and variable frequency, pickoff means for detecting movement of said other member from said null position, means responsive to said pickoff means for controlling said generating means and adjusting the frequency and relative phases of said polyphase current in accordance with the magnitude and sense of said detected movement, means for applying a force to one of said members to effect motion of said other member away from said null position, and means for manifesting the number of cycles of said polyphase current.

6. An integrating device comprising a support, a conductive member and a polyphase electromagnetic member adjacent thereto, one of said members being fixed to said support, means mounting the other of said members to said support for movement from a null position upon application of an input force thereto, said polyphase member having windings which produce a magnetic field movable relative thereto, a rotatable brush assembly having a plurality of brushes, each winding being uniquely connected with different brushes, a source of direct-current potential of fixed magnitude, means responsive to said source for varying the potential across different brushes with different phases upon rotation of said assembly, pickoff means for detecting movement of said other member from said null position, means responsive to said pickoff means for controlling the sense and magnitude of rotation of said brush assembly, and means for manifesting the number of cycles of rotation of said assembly.

7. In an eddy current forcing device, a support, an element mounted for displacement relative to said support, apparatus for substantially maintaining a predetermined relative positioning of said support and said element comprising, a conductive member fixed to said element, electromagnetic means fixed to said support for producing a constant peak-to-peak magnitude magnetic field in and about said conductive member, control means for causing said field to move relative to said conductive member at a rate proportional to the relative displacement of said support and said element, and means for manifesting the motion of said field.

8. The structure of claim 7 wherein said control means comprises a pickoff sensing relative displacement of said support and said element, a polyphase current generator supplying polyphase current to said electromagnetic means, and means responsive to said pickoff for causing said current to have a frequency proportional to said sensed displacement.

9. In a force balancing instrument, a support, a first element fixedly mounted to said support, and a second element mounted for displacement relative to said first element, apparatus for substantially maintaining a predetermined relative positioning of said elements comprising: a conductive member fixed to said second element; electromagnetic means fixed to said first element for producing a constant peak-to-peak magnitude magnetic field in and about said conductive member; control means for causing said field to move relative to said conductive member at a rate and in a sense according to the magnitude and sense of relative displacement of said elements, said control means comprising a pickoff sensing relative displacement of said elements, a polyphase current generator including a rotatable brush assembly supplying polyphase current to said electromagnetic means, and means responsive to said pickoff for rotating said assembly at a speed and in a sense in accordance with the magnitude and sense of said sensed displacement; and means for manifesting the motion of said field.

10. In a force balancing instrument, a first conductor, first magnetic means producing a magnetic field movable relative to said conductor whereby a force of a first sense is generated, a second conductor fixed to said first conductor and having a temperature conductivity coefficient substantially one-half that of said first conductor, second magnetic means producing a magnetic field movable relative to said second conductor in a sense opposite the sense of movement of said first field whereby a second force is generated of sense opposite the sense of said first force.

11. In an eddy current forcing device, a support, an element to be forced mounted on the support, first and second means for producing first and second opposite sense forces on said element to be forced, said second force having a magnitude substantially less than the magnitude of said first force, said first means comprising a conductive member and a magnetic member producing a magnetic field in and about said conductive member, said second means comprising a second conductive member and a magnetic member producing a magnetic field in and about said second conductive member, means for effecting equal and opposite relative motions of the field and conductive member of the respective force producing means, one member of each force producing means being secured to said support, the other member of each force producing means being secured to said element, said conductive member of said first means which produces the larger of said forces having a temperature conductivity coefficient and specific conductivity substantially less than the temperature conductivity coefficient and specific conductivity of the conductive member of the second means which produces the lesser of the forces, whereby change of net force due to change in temperature is diminished.

References Cited by the Examiner

UNITED STATES PATENTS

| | | | |
|---|---|---|---|
| 422,855 | 4/1890 | Van Depoele | 322—56 |
| 2,172,395 | 9/1939 | McSpadden. | |
| 2,376,421 | 5/1945 | Drake | 322—32 |
| 2,406,358 | 8/1946 | Doba | 343—11 X |
| 2,473,175 | 6/1949 | Ridenour | 343—7.4 |
| 2,484,867 | 10/1949 | Strub | 321—47 |
| 2,629,075 | 2/1953 | Deschmann | 322—56 |
| 2,854,617 | 9/1958 | Johnson | 322—32 |
| 2,882,034 | 4/1959 | Wuerth | 261—1 |
| 2,964,949 | 12/1960 | Wilcox | 73—503 |
| 3,077,782 | 2/1963 | Slater et al. | 73—503 |

FOREIGN PATENTS 589,526  6/1947  Great Britain.

RICHARD C. QUEISSER, *Primary Examiner.*

CHESTER L. JUSTUS, FREDERICK M. STRADER, SAMUEL FEINBERG, *Examiners.*